United States Patent
Scott et al.

(10) Patent No.: US 6,834,544 B2
(45) Date of Patent: Dec. 28, 2004

(54) LIQUID VOLUME MONITOR FOR PRESSURIZED TANKS

(75) Inventors: Robert C. Scott, Richardson, TX (US); L. Scott Hazelwood, Bonham, TX (US); Kenneth Stephens, Bonham, TX (US)

(73) Assignee: Fueling Technologies, Inc., Woodinville, WA (US)

( * ) Notice: Subject to any disclaimer, the term of this patent is extended or adjusted under 35 U.S.C. 154(b) by 0 days.

(21) Appl. No.: 10/621,270

(22) Filed: Jul. 18, 2003

(65) Prior Publication Data

US 2004/0050157 A1 Mar. 18, 2004

Related U.S. Application Data

(63) Continuation-in-part of application No. 10/159,136, filed on May 30, 2002, now Pat. No. 6,662,643.

(51) Int. Cl.$^7$ ............................ G01F 17/00; G01F 23/20
(52) U.S. Cl. ........................ 73/149; 73/290 R; 73/32 R; 73/296; 73/436
(58) Field of Search ................ 73/290 R, 296, 73/32 R, 433, 436, 437, 149

(56) References Cited

U.S. PATENT DOCUMENTS

| | | | | |
|---|---|---|---|---|
| 4,890,492 A | * | 1/1990 | Andrejasich et al. | ......... 73/292 |
| 5,156,042 A | * | 10/1992 | Carlin et al. | ................. 73/49.2 |
| 5,614,672 A | * | 3/1997 | Legendre et al. | ............. 73/437 |
| 6,202,486 B1 | * | 3/2001 | Kemp | ........................ 73/295 |

* cited by examiner

Primary Examiner—Hezron Williams
Assistant Examiner—Rodney T. Frank
(74) Attorney, Agent, or Firm—Roger Clapp

(57) ABSTRACT

A monitor for remote reading of liquid volumes in pressurized tanks utilizes a hollow buoyant displacement probe extending downwardly from a load cell carried adjacent a top port in the tank. The buoyant probe is optionally formed in detachable segments so that it can be assembled on site at the time of installation. The load cell is suspended from a flange cover acting as a closure for the tank port so that the load cell is freely pivotable on perpendicular horizontal axes, insuring that it is always oriented horizontally. A temperature-reading string is positioned in the open hollow center of the probe and has three spaced temperature sensing units along its length. Force data from the load cell, giving the apparent weight of the probe immersed in the liquid tank contents, and temperature data, from which volumetric data may be calculated, are fed to an external battery-operated microprocessor which periodically radios its data to a central computer which may be polled by phone lines from a remote monitoring station.

10 Claims, 5 Drawing Sheets

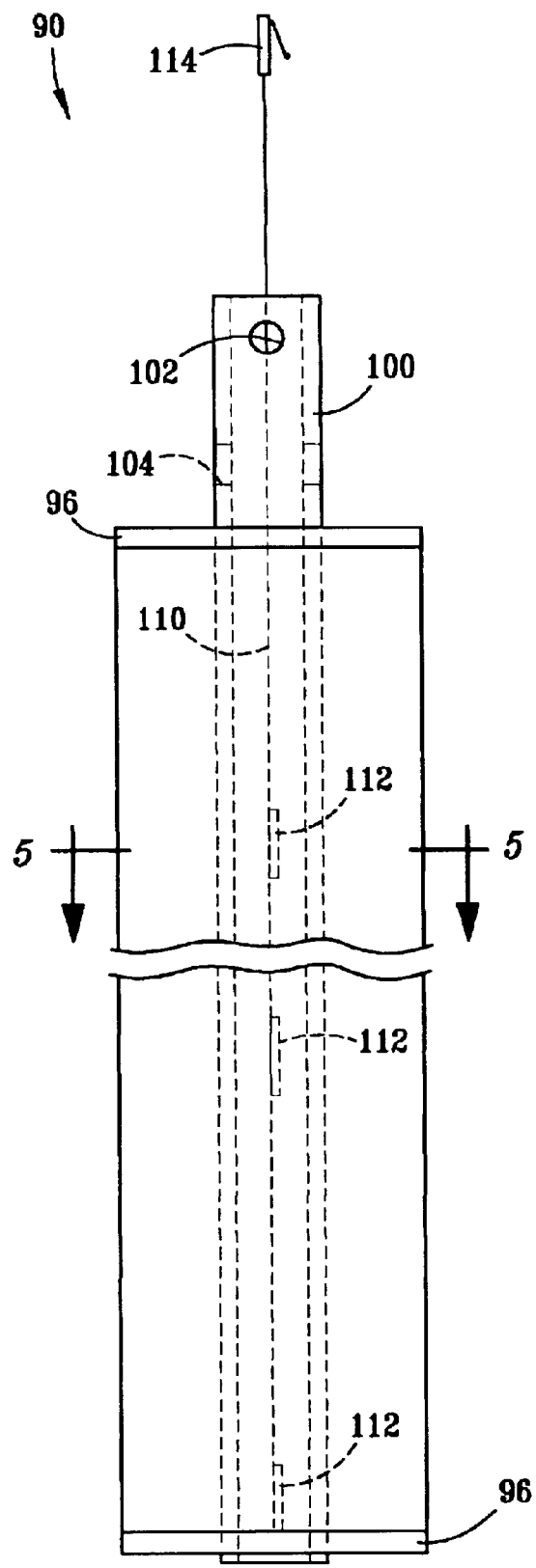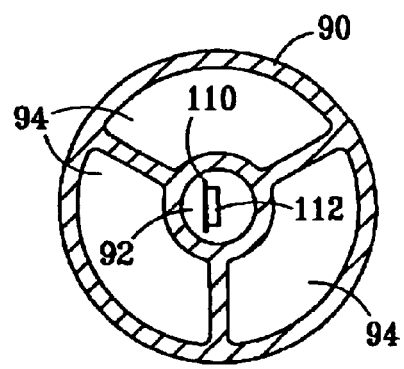

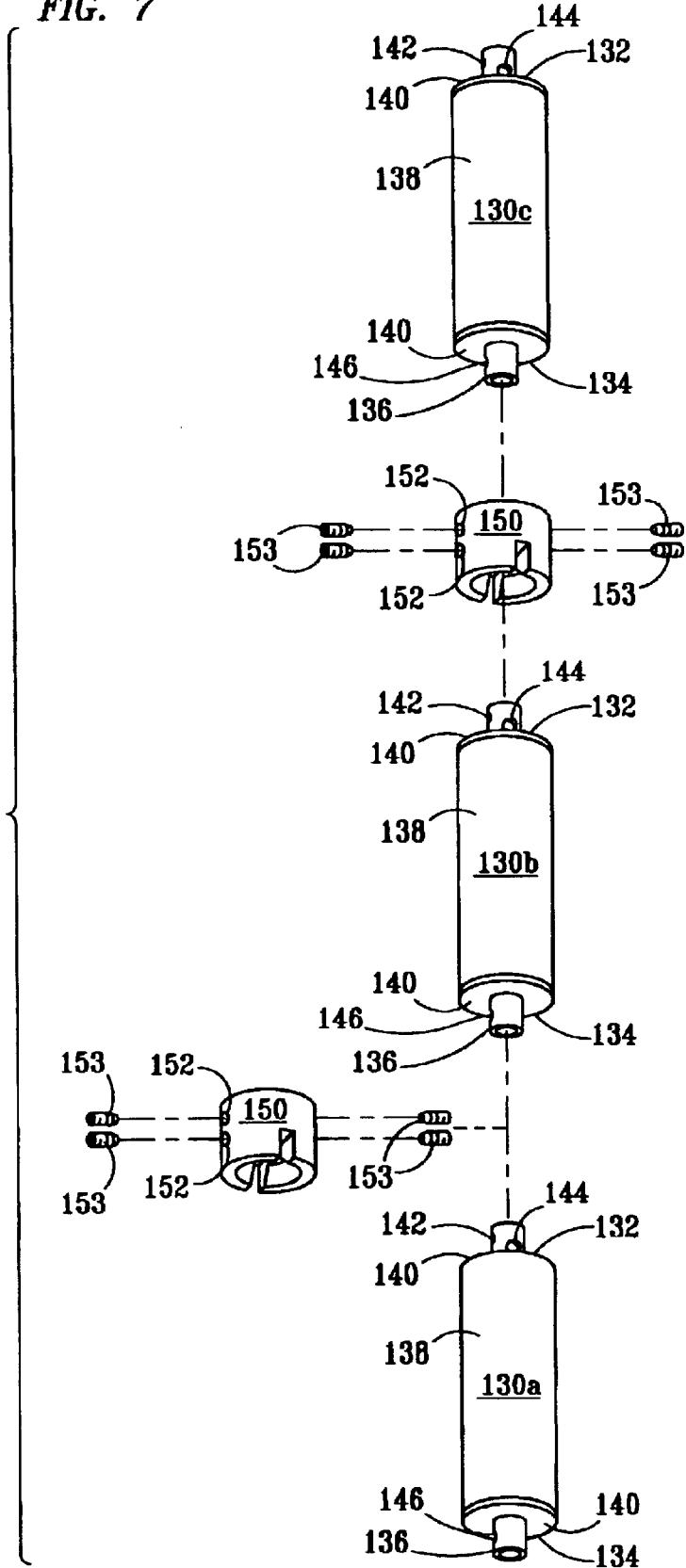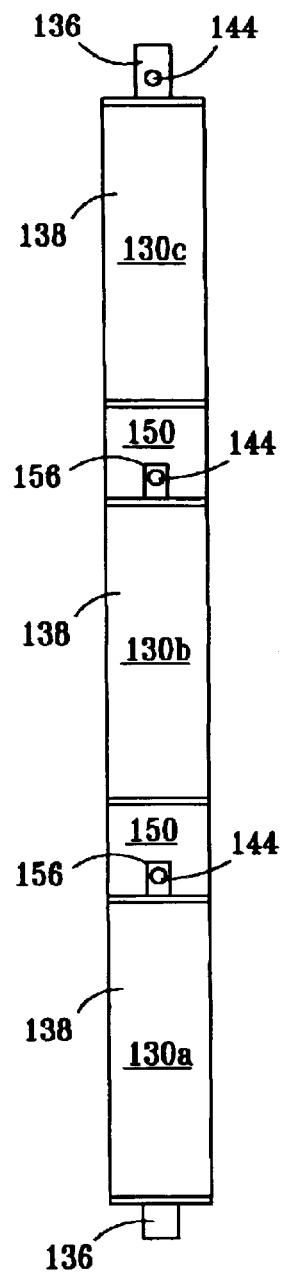

US 6,834,544 B2

LIQUID VOLUME MONITOR FOR PRESSURIZED TANKS

IDENTIFICATION OF RELATED APPLICATION

This application is a continuation-in-part of U.S. patent application Ser. No. 10/159,136, filed May 30, 2002 now U.S. Pat. No. 6,662,643.

TECHNICAL FIELD OF THE INVENTION

This invention relates to apparatus mountable to pressurized liquid hydrocarbon storage tanks for remote monitoring of the volume of contents therein, and more particularly to improvements in monitors which function by suspending a buoyant displacement probe in liquid tank contents from a load cell to measure the apparent weight of the probe.

BACKGROUND OF THE INVENTION

Storage tanks for liquefied hydrocarbon products such as butane and propane present special problems for the safe and ready monitoring of tank volume levels. This is particularly so where the tanks are located in remote or relatively inaccessible locations, making tank inspections inefficient and inconvenient.

LP gas storage tanks are classified as explosion hazards by the National Fire Protection Association, requiring special care in the design and installation of any ancillary equipment. The LP Gas Code(NFPA 58) defines the area within 5 feet of any tank, fill opening or point where LP gas is dispensed, loaded, vented or the like as a Class I, Division 1, Group D hazard.

Despite the daunting nature of the problems involved in safely installing a volume monitor for such a tank, it would be desirable to provide for the remote reading of volume levels so that fuel supplies can be maintained in adequate amounts without the necessity of site trips to ascertain the amount of fuel on hand.

It is known in the measuring art to determine the weight of liquid contents in a tank by suspending a buoyant probe in the liquid from a load cell to measure the apparent weight of the probe. By well-known calculational formulas, such measurement yields the weight of tank contents. Examples of such systems in the prior patent art may be found in U.S. Pat. Nos. 5,614,672, 5,157,968, 5,132,923 and 4,244,218.

U.S. Pat. No. 5,157,968 discloses a buoyant displacement probe mounted through a top tank port via a load cell for the determination of the liquid tank content weight. It also provides a second buoyant probe mounted via a load cell through a second tank port, so that the specific gravity of the liquid may be calculated from the second load cell reading and the content weight thus be converted to a volume. U.S. Pat. No. 5,614,672 likewise determines content weight by a load cell-mounted buoyant displacement probe. It, however, relies for volume determination on an assumption that the specific gravity of the liquid in the tank is a constant, known value.

Despite these efforts to provide tank monitors employing buoyant displacement probes for monitoring tank contents, there remains a lack of suitable devices employing this principle for safe and ready installation on remote hazardous storage tanks. This invention is directed to apparatus which will satisfy this need by providing an accurate and reliable monitoring system which can be safely installed for monitoring of the liquid contents of hazardous storage tanks.

SUMMARY OF THE INVENTION

The object of this invention is to provide a volume monitoring apparatus which may be readily and safely installed on both new and existing tanks used to store liquid propane, liquid butane or like hazardous liquids. An important consideration in this invention is to maintain a high degree of accuracy in the volume determination.

In accordance with the invention, there is provided a device for measuring the liquid volume in a tank, including a load cell positioned adjacent a port in the top wall of the tank. A downwardly extending displacement probe is supported by the load cell, and has sufficient length so that its lower end is adjacent to, but not touching, the tank bottom. A suspension mechanism for the load cell includes a universal joint means allowing the load cell to be oriented horizontally without regard to the orientation of the tank and port. The load cell monitors the apparent weight of the probe, and thus the weight of the liquid contents in the tank. An elongate temperature probe is mounted in the same port and has at least one temperature sensor for measuring the temperature of the liquid in the tank. This temperature reading may then be used with the known specific gravity-temperature curve of the stored liquid to utilize the specific gravity of the stored liquid at the measured temperature to calculate the volume of the liquid content.

In a specific embodiment of the invention, the displacement probe is an elongate hollow member. The temperature probe is a string extending through the open center of the displacement probe, the string carrying a plurality of spaced thermometric units for measuring the temperature of the tank liquid at spaced levels of the tank. The preferred probe of the invention is in modular form, comprising plural discrete segments which may be assembled on site during installation of the monitor by the use of joining collars, one positioned between each adjacent segment.

The preferred form of the invention includes a riser pipe secured in the tank port, a mounting flange threaded on the riser pipe and a flange cap secured to the flange to close the port, the flange cap supporting a hanger bracket from which the load cell and displacement probe are suspended by way of a universal joint assembly which insures that the load cell, in the form of a planar beam sensor is maintained in true horizontal orientation.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 4 is a plan view of the displacement probe and temperature probe of the device of FIG. 1, taken at right angles to the depiction of the probe in FIG. 1;

FIG. 5 is a horizontal cross-section taken along line 5—5 IN FIG. 4;

FIG. 7 is an exploded perspective view of a preferred modular form of buoyant displacement probe for use in the system depicted in FIGS. 1–6; and FIG. 8 is a plan view of the assembled probe of FIG. 7.

DESCRIPTION OF THE PREFERRED EMBODIMENTS

Figure 1:
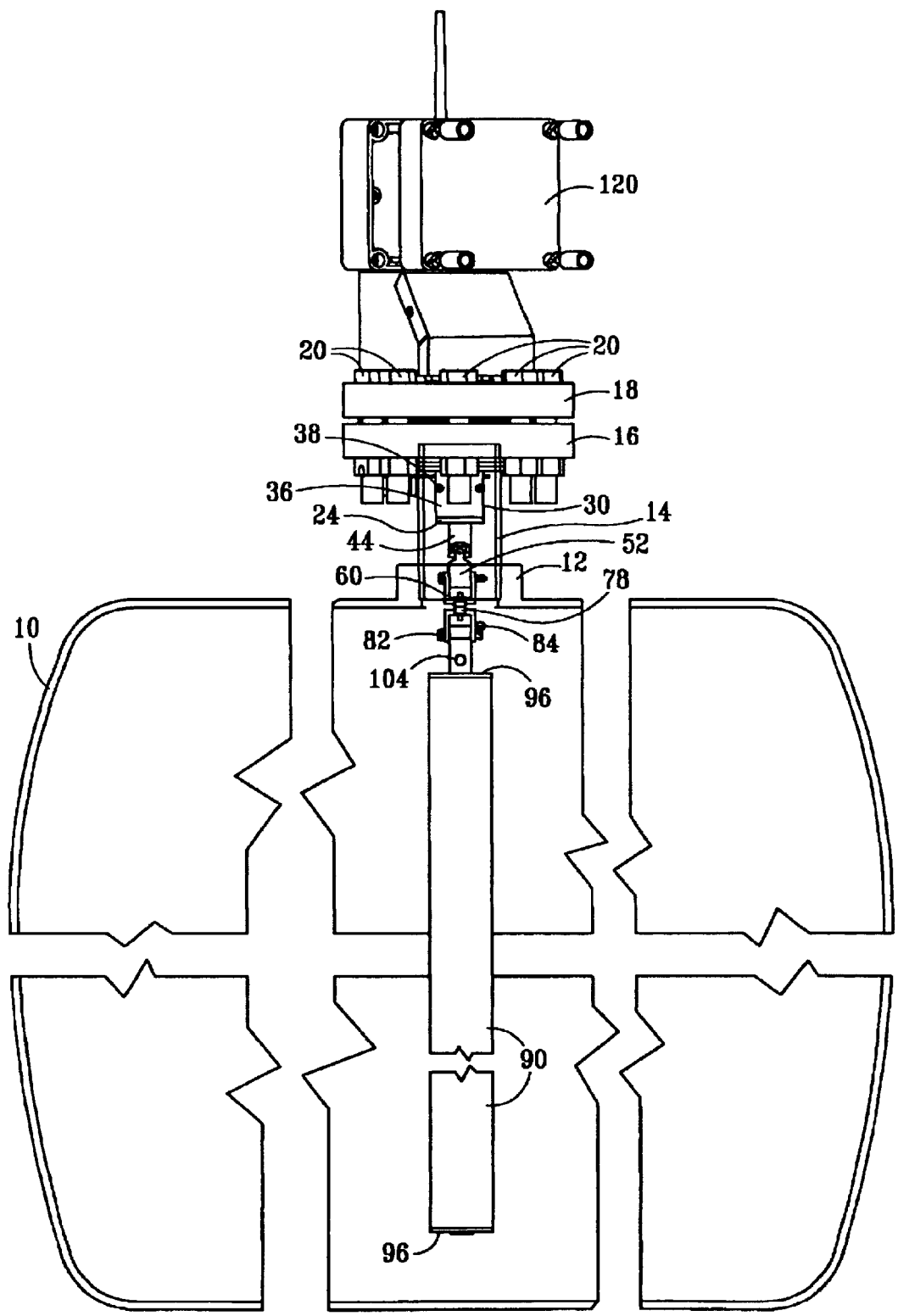
FIG. 1 is a plan view of a monitor constructed in accordance with this invention mounted on a pressurized tank.
Figure 2:
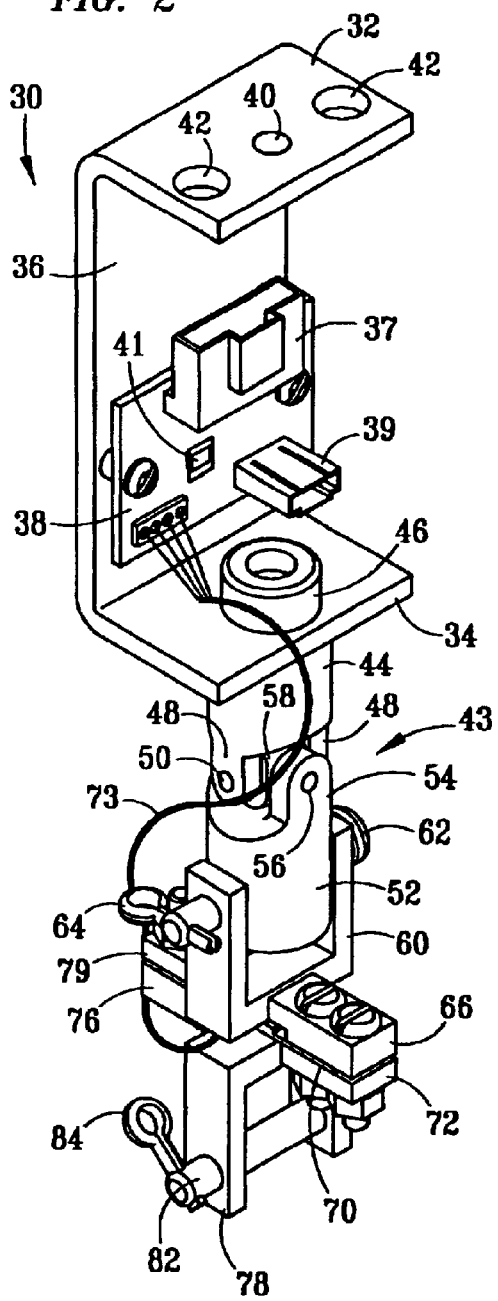
FIG. 2 is a perspective view of the hanger bracket, universal joint assembly and load cell of the device of FIG. 1.
Figure 3:
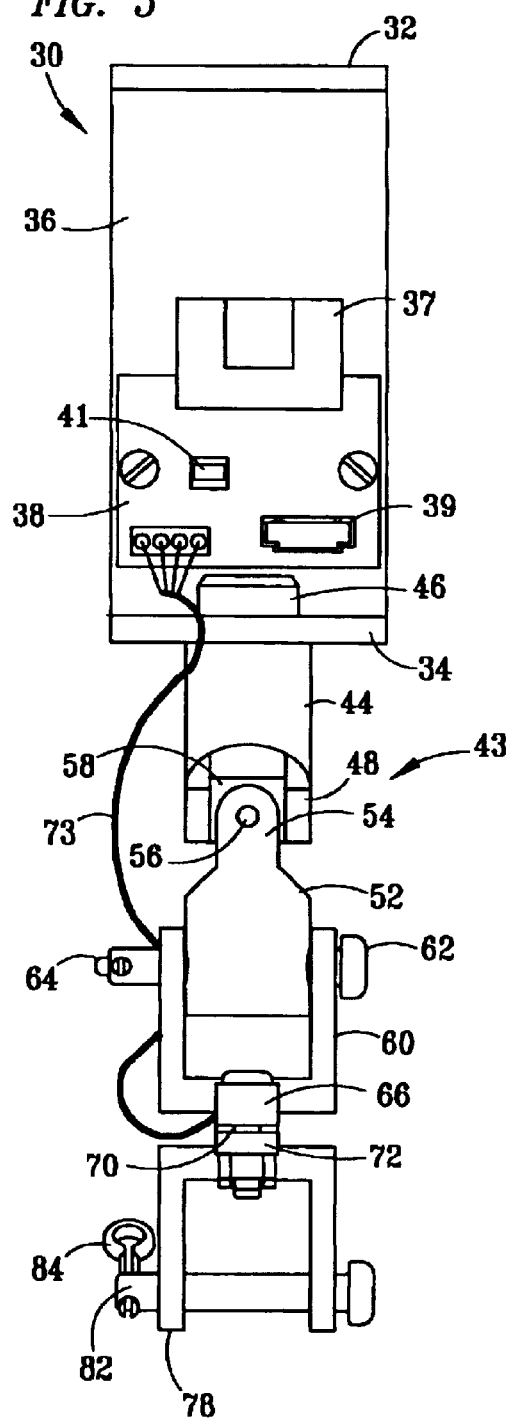
FIG. 3 is a plan view of the portion of the apparatus shown in FIG. 2.
Figure 6:
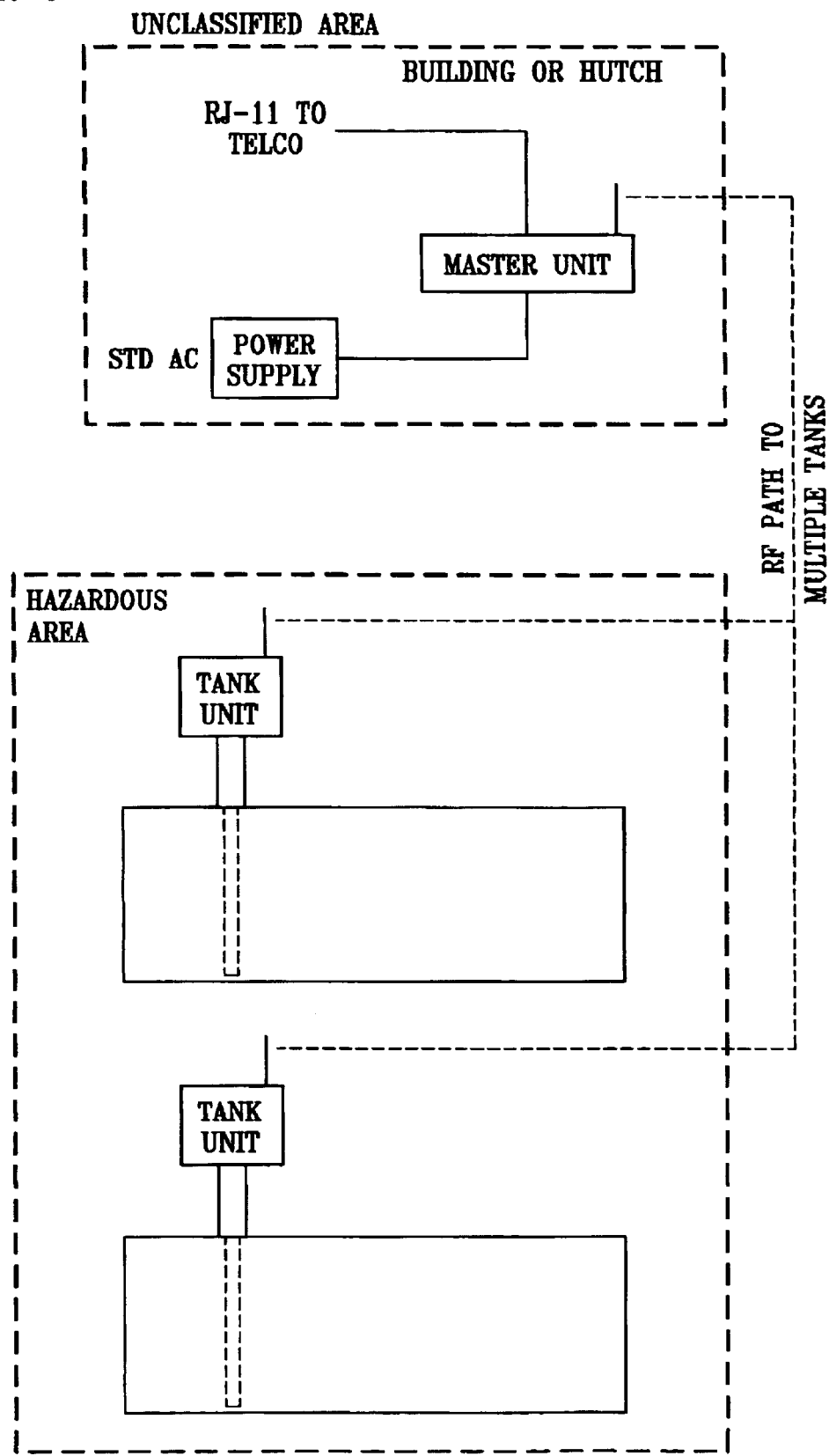
FIG. 6 is a schematic illustration of a monitoring system utilizing the invention.

As illustrated in the drawings, a storage tank 10 for liquefied propane, butane or similar hazardous liquid is provided with a monitoring apparatus constructed in accordance with the invention by installation through a single top port 12. Existing tanks are conventionally provided with such an inspection port having a two inch diameter, and the preferred form of apparatus of this invention may be readily and safely installed in such a pre-existing port.

A threaded riser pipe 14 is secured and sealed in port 12, and extends above the port a few inches. Typically, pipe 14 may be about six inches in length. A heavy-duty flange 16 is threaded and sealed to riser 14. Flange may be provided with a circular array of eight bolt holes. A flange gasket and flange cover 18 having conventional pressure-proof electrical cable pass-through is secured to flange 16 by conventional means such as bolts 20 to close the port 12 in sealed, pressure-proof fashion.

A hanger bracket 30 is provided for suspending the in-tank elements of the apparatus. Hanger bracket 30 has an upper flange 32, a lower flange 34, and a vertically extending web 36 connecting the flanges 32 and 34. A circuit board 38 is mounted on web 36. The details of construction of board 38 are conventional. Board 38 is provided with a plug 37 for connecting to the cabling of the pass-through flange cover 20 to communicate the data received by board 38. Web 36 also carries a temperature sensor 41 for measuring the air temperature in the upper portion of the tank, connected to circuit board 38. This permits temperature compensation of data from the load cell described below. An aperture 40 is provided in upper flange 32 for alignment with the pressure measuring port of the flange cover 18 for measuring tank pressures. Upper flange 32 also has a pair of mounting holes 42 for bolting bracket 30 securely to flange cover 18.

A universal joint assembly 43 is suspended below hanger bracket 30. The assembly 43 may be any suitable commercially available universal joint assembly, such as Part Number 64565K1 from McMaster-Carr Supply Company, depicted here. The upper body 44 of assembly 43 is secured to the lower face of flange 34 by bolt 46. A pair of spaced legs 48 extend downwardly from upper body 44, and carry an upper horizontal pivot pin 50. The lower body 52 of assembly 43 has upwardly extending spaced legs 54 which carry a lower horizontal pivot pin 56. Pins 50 and 56 are oriented so that the vertical planes through their axes are mutually perpendicular. Each of the pins 50 and 56 extend through a pivoting central body 58 of the universal joint assembly 43, positioned between legs 48 and 54. This arrangement permits lower body 52 to hang vertically plumb from pin 56, even if the lower flange 34 of hanger bracket 30 is not oriented horizontally because of a tilt in the tank 10, the tank port 12, or for any other reason.

"An upper load cell-mounting u-bracket 60 is secured to the universal joint assembly 43 at its lower body 52 by means of a clevis pin 62 secured by a cotter pin 64. U-bracket 60 has a horizontal leg 66 extending therefrom. One end of a load cell 70 in the form of a planar beam sensor is secured to leg 66 by means of a first compression clamp 72. The opposite end of load cell 70 is secured to leg 76 of lower u-bracket 78 by second compression clamp 79. Thus, downward force on lower u-bracket 78 will produce an electrical signal from planar beam sensor load cell 70 which measures the magnitude of the force. The wiring harness 73 of planar beam sensor load cell 70 is connected to circuit board 38."

The effect of universal joint assembly 43 is to insure that planar beam sensor 70 is oriented horizontally. This eliminates the need for measurement and correction for any variation of the load cell 70 from the horizontal. Were the cell 70 permitted to be oriented out of horizontal, its measurements of force would be reduced by the sine of the angle of deviation. Universal joint assembly 43 eliminates this source of error, and the necessity of compensation.

Lower u-bracket 78 is provided with a clevis pin 82 secured by cotter pin 84 for mounting a buoyant displacement probe 90. Probe 90 may be a hollow tubular aluminum extrusion, and includes a vertically extending central passage 92, as well as vertically extending side chambers 94 provided to lighten probe 90 and increase its buoyancy. Annular covers 96 are secured to each end of probe 90 to close chambers 94 while leaving central passage 92 open to the liquid contents of tank 10. A mounting neck 100 extends from the upper end of probe 90, and is provided with a through-hole 102 for receiving the clevis pin 82 to suspend probe 90 from lower u-bracket 78. A second through-hole 104 is provided in neck 100, so that a screwdriver or the like may be placed therethrough to support probe 90 on the riser pipe 14 during installation, while the installer makes the wiring connections to circuit board 38.

"Probe 90 houses a flexible temperature probe string 110 which passes downwardly through open central passage 92. A plurality of temperature sensors 112 are spaced along temperature probe string 110 for measuring the temperature of the liquid contents at spaced levels. In the preferred embodiment, the sensors 112 are spaced so that they are suspended at the 5%, 35% and 65% of tank height levels within the tank. Each sensor 112 communicates separately with a signal connector 114 located at the upper end of temperature probe string 110. Connector 114 plugs into circuit board 38 at temperature plug-in 39. This plug-in connection is adequate to support the temperature probe string 110, because of its light weight."

The data conveyed from the load cell 70 to circuit board 38 through wiring harness 73, and the temperature data coming to the board through connector 114, is communicated externally of the tank to a microprocessor housed in control box 120 secured atop flange. The microprocessor calculates the volume of contents in the tank from: (1) the apparent probe weight data from load cell 70, compensated for air temperature surrounding load cell 70 as measured by temperature sensor 41; (2) the liquid temperature data from temperature probe string 110; and (3) the specific gravity curve for the stored liquid. Control box 120 also houses a radio frequency transmitter/receiver which can transmit the data to a master computer. This eliminates the need for a power hook-up within the hazardous area of the tank, as the microprocessor and radio may be conveniently operated on safe battery power.

A suitable arrangement of the monitoring station is depicted in FIG. 5. A plurality of tanks with monitors installed as described above communicate by radio to a master computer housed under roof at a nearby location outside the hazardous zone. The master computer can be polled periodically by telephone from a remote monitoring station located many miles away. Of course, when remote downloading is not required, as where an on-site manned facility exists, the data can be accessed directly at the master computer. Indeed, the master computer may be a pc used for office or other functions.

FIGS. 7 and 8 depict a preferred form of displacement probe for use in the system described above. This probe, which is in a modular form of discrete plural segments which may be assembled during installation, is especially versatile. In the event that a tank to be monitored is indoors, for example, a probe in this form may be installed even though the vertical clearance above the tank would be insufficient to permit a one-piece probe to be put into place. Also, even in the case of outdoor tanks, the height of the tank may be so great as to make it difficult to handle a one-piece probe of sufficient length for the job. The probe of FIGS. 7 and 8 may be transported in pieces to the job site and assembled during installation of the system.

The modular displacement probe of FIGS. 7 and 8 is comprised of discrete segments 130, which may be substantially identical. The segments are chosen in number and length so that they may easily be handled and connected on site to form the completed probe of FIG. 8 having a length to extend to near the bottom of the tank to be monitored. The illustrated displacement probe is shown with three such segments 130a, 130b and 130c, each of which has an upper end 132 and a lower end 134. Each segment 130 includes a central tube 136 and an outer cylinder 138. The annular void space between each tube 136 and its corresponding outer cylinder 138 is sealed by end caps 140 which join tube 136 and cylinder 138 adjacent each end of segment 130. Tube 132 extends beyond each end cap 140 to provide a location for joining adjacent segments 130 together during installation of the monitor. The portion of each tube 136 at the upper end 132 is provided with a diametrical upper through-hole 142 adjacent its end. A second diametrical through-hole 144 of larger size is formed through tube 132, at an axial location between through-hole 142 and the adjacent end cap 140.

Adjacent the lower end 134 of each segment 130, tube 136 is provided with a diametrical lower through-hole 146, which is oriented so that it is parallel to the upper through-hole 142. Adjacent segments 130 are secured together during installation by a joining collar 150. Collar 150 has a central bore corresponding to the outer diameter of tube 136, so that it slides snugly around tube 136. It is provided with a pair of axially spaced threaded diametrical through-holes 152, which are a match for holes 142 and 146 on each tube 136. Set screws 153 are provided for extending into both ends of the collar holes 152 into the tube 136 at its through-holes 142 and 146. A deep diametrical slot 156 is formed in the lower face of collar 150.

It will be seen that the displacement probe of FIGS. 7 and 8 may be formed in the appropriate number and length of segments 130 and transported to the installation site unassembled. Assembly of the probe and installation proceeds with the lowermost segment 130a first. This segment 130a is extended into the tank through the tank port 12, and through-hole 144 is used to receive the blade of a screwdriver so that the screwdriver may rest on the top of the tank riser 14 and support segment 130a while a joining collar 150 and second segment 130b are secured thereto. This proceeds by sliding collar 150 on the upper end of tube 136, with the slot 156 sliding over the screwdriver blade. Set screws 153 are secured in each end of the lower hole 152 of collar 150, extending into upper through-hole 142 of tube 136 so that the collar is firmly secured to the lowest segment 130a.

With the collar 150 secured in place on the lowest segment 130s, another segment 130b is inserted into the collar so that its tube 136 at its lower end 134 abuts the tube 136 of the lowest segment 130a at the upper end 134 thereof. Set screws 153 are then secured through each end of the higher of the collar threaded holes 152 and into through-hole 146 of segment 130b. With this accomplished, the two segments 130a and 130b are securely joined and form a continuous hollow bore therethrough on the inside of their respective registered tubes 136. The joined assembly can then be lowered further into the tank by removing the screwdriver blade.

The procedure can be repeated identically for each segment 130 to be added to the displacement probe. After all segments have been joined, and the complete probe lowered into the tank, the hole 142 through the tube 136 at the upper end 132 of the uppermost segment (130c in the example illustrated) may be used to suspend the displacement probe from the monitor's load cell. Also, the temperature sensor array may be fed down through the completed probe through its central bore.

The collars 150, in addition to enabling easy assembly of the modular probe on site, contribute to the versatility of the probe design by permitting the user to readily vary the probe weight. The collars 150 may be fabricated to increase the mass of the modular probe for applications in which the tank liquid has a relatively high specific gravity requiring a heavier probe. Where this is the case, the mass of the probe may be readily increased by using a collar material of higher density and/or by using collars of larger outside diameter. This flexibility enables the basic modular probe design to serve for monitoring fluids with a wide range of specific gravities, with simple adjustment to the collar fabrication.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A device for measuring the liquid volume in a tank comprising:
   (a) a load cell positioned adjacent a port in the top wall of the tank;
   (b) a modular displacement probe formed in plural discrete detachable segments adapted to be assembled on site, said probe supported by the load cell, and extending down into the tank, the displacement probe having a lower end near the tank bottom, whereby the load measured by the load cell gives the apparent weight of the probe when immersed in the liquid contents of the tank; and
   (c) a universal joint suspension mechanism mounted at the tank port for supporting the load cell and the probe, whereby the load cell maintains a constant attitude with respect to the horizontal.

2. The device of claim 1, wherein the probe is formed by substantially identical plural segments united by a joining collar positioned between each successive segment.

3. The device of claim 2, further comprising:
   (a) a riser pipe secured in the tank port and extending upwardly therefrom;
   (b) a mounting flange threaded onto the riser pipe;
   (c) a flange cap secured to the flange, to which the hanger bracket is fastened.

4. The device of claim 1, further comprising means mounted adjacent said tank port for measuring the temperature of the liquid contents of the tank.

5. The device of claim 4, wherein the displacement probe has a vertically extending hollow bore open to the liquid contents of the tank, and supports a temperature measuring string extending downwardly through said hollow chamber, said string having a spaced array of temperature sensors positioned therealong.

6. A device for measuring the liquid volume in a tank comprising:
 (a) a load cell positioned adjacent a port in the top wall of the tank;
 (b) a modular displacement probe formed in plural discrete detachable segments adapted to be assembled on site during insertion of the probe into the tank, said probe supported by the load cell, and extending down into the tank, the displacement probe having a lower end near the tank bottom, whereby the load measured by the load cell give the apparent weight of the probe when immersed in the liquid contents of the tank;
 (c) coupling means for securing adjacent segments of the probe together during insertion of the probe into the tank without requiring rotation of any part of the probe; and
 (d) means associated with the displacement probe for measuring the temperature of the liquid contents of the tank.

7. The device of claim 6, wherein each detachable segment of the probe has a hollow interior which is registered with the hollow interior of the adjacent segment, whereby a hollow central bore is formed throughout the probe, and means for measuring temperature is a string of spaced temperature sensors positioned in said hollow central bore.

8. The device of claim 6, wherein the coupling means comprises a joining collar surrounding the adjacent ends of each pair of adjacent segments of the probe and at least one fastener securing each such joining collar and the adjacent probe segments.

9. The device of claim 7, wherein the coupling means comprises a joining collar surrounding the adjacent ends of each pair of adjacent segments of the probe and at least one fastener securing each such joining collar and the adjacent probe segments.

10. The device of claim 6, further comprising transverse aperture means located near the top of each segment, adapting the segment to be supported by a screwdriver placed therethrough resting atop the tank with the segment extending into the tank while the next higher segment is secured thereto.

* * * * *